(12) United States Patent
Oelschlegel

(10) Patent No.: US 6,659,232 B2
(45) Date of Patent: Dec. 9, 2003

(54) METHOD AND DEVICE FOR POSITION DETECTION OF AN OBJECT ALONG AN ACOUSTIC-SIGNAL CONDUCTOR

(75) Inventor: Christian Oelschlegel, Hagen (DE)

(73) Assignee: K.A. Schmersal GmbH & Co., Wuppertal (DE)

( * ) Notice: Subject to any disclaimer, the term of this patent is extended or adjusted under 35 U.S.C. 154(b) by 0 days.

(21) Appl. No.: 10/190,190

(22) Filed: Jul. 3, 2002

(65) Prior Publication Data

US 2003/0006101 A1 Jan. 9, 2003

(30) Foreign Application Priority Data

Jul. 7, 2001 (DE) .......................... 101 33 171

(51) Int. Cl.⁷ ............................... B66B 3/02
(52) U.S. Cl. ..................... 187/394; 367/95; 367/127; 367/901
(58) Field of Search ................. 187/394, 391, 187/393, 399; 367/2, 4, 95–97, 104, 107, 127, 901

(56) References Cited

U.S. PATENT DOCUMENTS

| | | | | |
|---|---|---|---|---|
| 4,041,495 A | * | 8/1977 | Martin | 342/465 |
| 4,238,844 A | * | 12/1980 | Ueda et al. | 367/117 |
| 4,375,057 A | * | 2/1983 | Weise et al. | 187/394 |
| 4,392,214 A | * | 7/1983 | Marini et al. | 367/127 |
| 4,494,224 A | * | 1/1985 | Morrell et al. | 367/2 |
| 4,606,015 A | * | 8/1986 | Yamaguchi | 367/95 |
| 5,306,882 A | * | 4/1994 | Gerwing et al. | 187/394 |
| 5,406,200 A | * | 4/1995 | Begin et al. | 324/207.12 |
| 5,736,695 A | * | 4/1998 | Hoepken | 187/394 |
| 5,883,345 A | * | 3/1999 | Schonauer et al. | 187/394 |
| 6,311,803 B1 | * | 11/2001 | Turk | 187/394 |
| 6,366,532 B1 | * | 4/2002 | Hoepken | 367/124 |
| 6,570,817 B2 | * | 5/2003 | Hoepken | 367/124 |

FOREIGN PATENT DOCUMENTS

DE     19631490     2/1998

* cited by examiner

Primary Examiner—Jonathan Salata
(74) Attorney, Agent, or Firm—Patterson, Thuente, Skaar & Christensen, P.A.

(57) ABSTRACT

The invention relates to the detection of the position of an object which can be moved along an acoustic-signal conductor of ferromagnetic material, in which an acoustic signal is incoupled in a clocked manner into the acoustic-signal conductor by means of a signal input coupler connected to a signal transmitter, extracted by means of a signal output coupler and the extracted signal is evaluated by an evaluating circuit for generating a signal representative of the instantaneous position of the object, wherein an opposite magnetic field for the magnetic field generated by the acoustic signal is incoupled in each case after the incouplion of the acoustic signal.

22 Claims, 2 Drawing Sheets

METHOD AND DEVICE FOR POSITION DETECTION OF AN OBJECT ALONG AN ACOUSTIC-SIGNAL CONDUCTOR

FIELD OF THE INVENTION

The invention relates to a method and a device for position detection of an object which can be moved along an acoustic-signal conductor of ferromagnetic material, particularly of a lift cage which can be moved along a vertical shaft. Such a method and device may be used for controlling the position of a lift cage or the like and thus ensuring a correct positioning at predetermined stops according to floor levels.

DESCRIPTION OF THE RELATED ART

From European Patent No. EP 1 065 517 A1, a device for detecting the position of a lift cage moving along a vertical shaft by means of a ferromagnetic acoustic signal conductor extended vertically in the shaft and having a predetermined, essentially uniform, velocity of sound propagation and with a signal input coupler connected to a signal transmitter and located at the lift cage for incoupling an acoustic signal into the acoustic signal conductor is known. In this arrangement, a signal output coupler, which is connected to an evaluating circuit for generating a signal representative of the instantaneous position of the lift cage, is arranged adjacent to at least one end of the acoustic signal conductor. The acoustic signal conductor may have an acoustic-signal attenuator at least at one end. The signal input coupler can be triggered by the evaluating circuit at time intervals which are of such a magnitude that no superpositions with previous acoustic signals incoupled by the signal input coupler and subsequently reflected at the ends of the acoustic-signal conductor occur.

A similar device for position detection in which calibrating signals are additionally incoupled into the acoustic-signal conductor is known from German Patent No. DE 199 03 644 C1. A further device for measuring the length of a measured length from a predetermined point to an object which can be moved along the measured length is known from published German Patent Application No. DE 100 06 379 A1, the object exhibiting two signal input couplers for acoustic signals.

It has been found in such devices for position detection that problems occur with respect to the acoustic-signal transmission to the signal output coupler in the case of relatively great lengths of the acoustic-signal conductor. More detailed investigations revealed that due to the fact that a magnetic field which flows through the acoustic-signal conductor is generated by the signal input coupler for incoupling the acoustic signal, a small residual field which leads to the attenuation of acoustic signals remains due to remanence. Although this is of the order of magnitude of 15 to $30\times10^{-6}$ Nepers/m, it in the end leads to the fact that the acoustic signal can be attenuated by up to more than 50% with a length of 130 m of the acoustic-signal conductor.

SUMMARY OF THE INVENTION

It is an object of the invention to provide a method for the detection of the position of an object moveable along an acoustic-signal conductor of ferromagnetic material which make it possible to prevent a significant acoustic-signal attenuation due to the acoustic-signal conductor even with great lengths of the acoustic-signal conductor.

It is a further object of the invention to provide a device for the detection of the position of an object moveable along an acoustic-signal conductor of ferromagnetic material which make it possible to prevent a significant acoustic-signal attenuation due to the acoustic-signal conductor even with great lengths of the acoustic-signal conductor.

It is a further object of the invention to provide a position detection for a lift cage with increased precision.

The invention concerns a method for detecting the position of an object moveable along an acoustic-signal conductor of ferromagnetic material, comprising the steps:

incoupling an acoustic signal in a clocked manner into the acoustic-signal conductor by means of a signal input coupler connected to a signal transmitter;

extracting the incoupled signal by means of a signal output coupler; and evaluating the extracted signal by an evaluating circuit for generating a signal representative of the instantaneous position of the object;

wherein after the acoustic signal has been incoupled, an opposite magnetic field is applied for compensating for the residual magnetization originating from the incoupling of the acoustic signal.

The invention further concerns a method for detecting the position of an object moveable along an acoustic-signal conductor of ferromagnetic material, comprising the steps of:

incoupling an acoustic signal in a clocked manner into the acoustic-signal conductor by means of a signal input coupler connected to a signal transmitter;

extracting the incoupled signal by means of a signal output coupler; and evaluating the extracted signal by an evaluating circuit for generating a signal representative of the instantaneous position of the object;

wherein in each case after the acoustic signal has been incoupled, a number of acoustic compensation signals having the opposite phase to the incoupled acoustic signal are incoupled at the beginning and subsequently in each case with changing phases and decreasing amplitude.

The invention further concerns a device for detecting the position of an object moveable along an acoustic-signal conductor of ferromagnetic material, comprising a signal input coupler connected to a signal transmitter for the clocked incoupling of an acoustic signal into the acoustic-signal conductor and a signal output coupler which is connected to an evaluating circuit for generating a signal representative of the instantaneous position of the object, wherein in each case after the incoupling of the acoustic signal, an opposite magnetic field can be incoupled for compensating for the residual magnetization originating from the incoupling of the acoustic signal.

The invention further concerns a device for detecting the position of an object moveable along an acoustic-signal conductor of ferromagnetic material, comprising a signal input coupler connected to a signal transmitter for the clocked incoupling of an acoustic signal into the acoustic-signal conductor and a signal output coupler which is connected to an evaluating circuit for generating a signal representative of the instantaneous position of the object, wherein in each case after incoupling of the acoustic signal, a sequence of a number of acoustic compensation signals with opposite phase to the incoupled acoustic signal can be incoupled at the beginning and subsequently in each case with changing phases and decreasing amplitude.

In this arrangement, a compensation energy associated with the incoupled acoustic signal is incoupled into the acoustic-signal conductor, which generates a coercive force which has the effect that the acoustic-signal conductor residually magnetized by the incouplion of the acoustic signal is substantially demagnetized or this magnetic field is substantially overcompensated for to form a corresponding magnetic field in the opposite direction. In the first case, the compensation energy follows the incoupled acoustic signal and essentially leads to a demagnetization. The result is that the attenuation is <$10^{-6}$ Nepers/m so that even with great lengths of the acoustic-signal conductor or the use of an acoustic signal reflected at one end of the acoustic-signal conductor, the attenuation remains small enough to ensure correct extraction by the signal output coupler. In the second case, overcompensation or opposite magnetization takes place to such an extent that an acoustic signal incoupled later finds an acoustic-signal conductor with a magnetic field of opposite direction and magnitude to that generated by itself so that the attenuation of the acoustic signal propagating through the acoustic-signal conductor also remains correspondingly small in this case. This compensation or overcompensation is suitably used for any type of incoupled acoustic signals, whether they are used, for example, for measuring, calibration or the like.

The compensation energy can be introduced, for example, by heating to the Curie temperature, mechanical knocking or magnetic fields and, in particular, by at least one acoustic compensation signal following the acoustic signal.

For the acoustic signals, a signal input coupler is provided which either can be arranged in a fixed position at one end of the acoustic-signal conductor, while a corresponding signal output coupler is arranged on the moving object, for instance a lift cage, or which is arranged on the moving object, while the signal output coupler is stationary in the area of one end of the acoustic-signal conductor.

Further objects, advantages and embodiments of the invention can be found in the subsequent description.

BRIEF DESCRIPTION OF THE DRAWINGS

Below the invention will be explained in greater detail by means of illustrative embodiments shown schematically in the attached figures.

DESCRIPTION OF PREFERRED EMBODIMENTS

Figure 1:
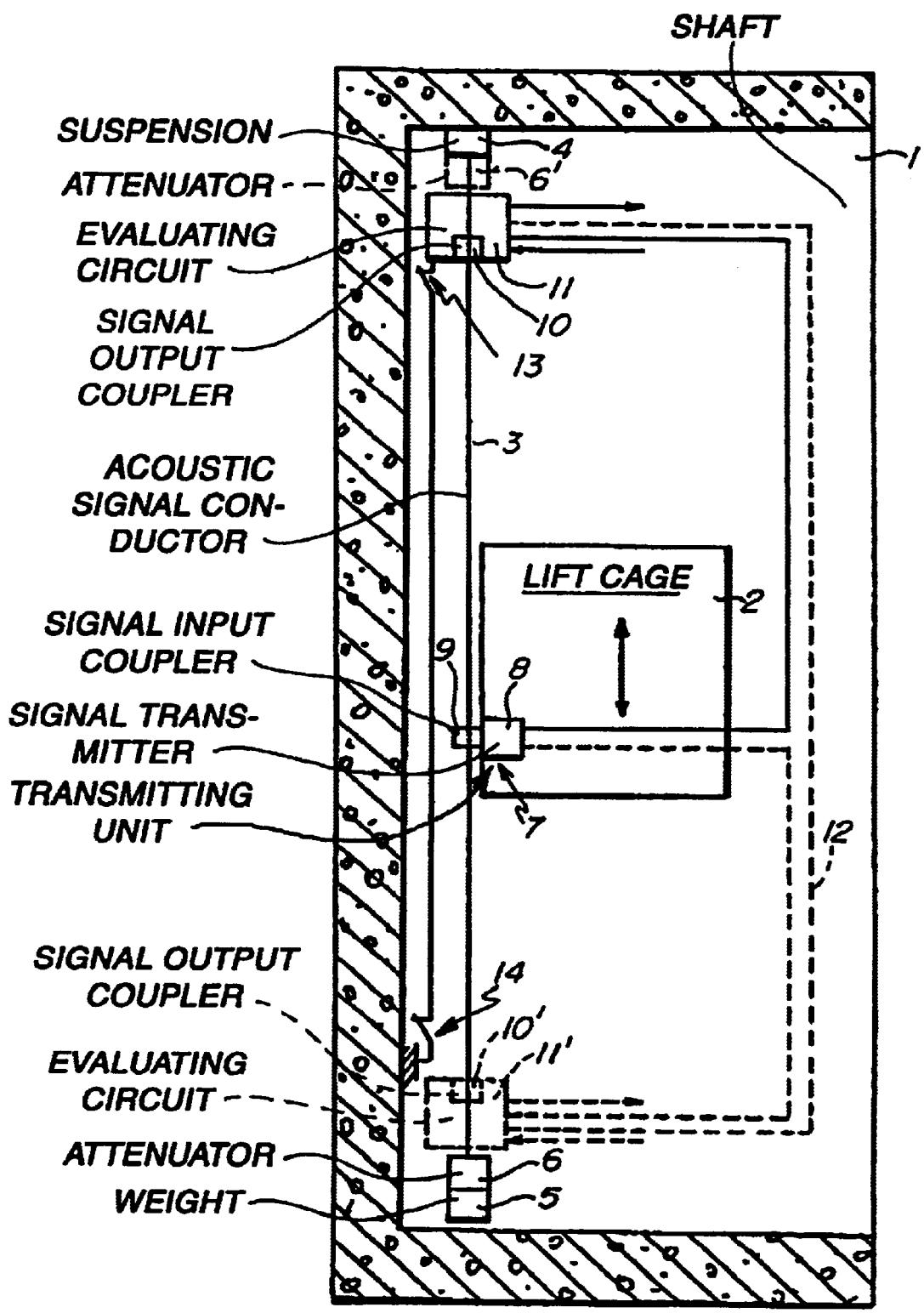
FIG. 1 is schematically shows a lift arranged in a shaft with a device for position determination.

A lift (not shown in detail) with a lift cage 2, which can be moved vertically in the shaft is provided in a shaft 1. In addition, the shaft 1 contains a ferromagnetic acoustic-signal conductor 3 which is mechanically attached to the shaft head via a suspension 4, while a weight 5, possibly together with a attenuator 6, braces the acoustic-signal conductor 3 and keeps it vertically in the shaft 1, at the lower end of the acoustic-signal conductor 3 extending essentially over the height of the shaft 1.

The metallic, particularly magnetostrictive acoustic-signal conductor 3 have a predetermined, essentially uniform velocity of propagation for the sound and is, in particular, a metal wire which suitably has a diameter of the order of magnitude of about 1 mm.

The lift cage 2 is provided with a transmitting unit 7 for a clocked acoustic signal in the ultrasonic range which have a signal transmitter 8 with clock generator and a signal input coupler 9, located at the lift cage 2, for incouplion of the acoustic signal into the acoustic-signal conductor 3. An acoustic signal incoupled by the latter propagates towards both ends of the acoustic-signal conductor 3 and is reflected there in each case and, when it passes through the attenuator 6 which may be provided, is attenuated by the latter.

Adjacent to one end of the acoustic-signal conductor 3, shown adjacent to the upper end, a signal output coupler 10 is provided which is connected to an evaluating circuit 11 for generating a signal representative of the instantaneous position of the lift cage 2.

The evaluating circuit 11 is used for performing the measurement of the acoustic delay and the calculation of the position of the lift cage 2 and for output couplerting the output coupler of the position of the lift cage 2, possibly with extrapolated intermediate positions between those actually measured.

The evaluating circuit 11 which advantageously also comprises a microprocessor can also be used for triggering the transmitting unit 7, i.e. to cause it to incouple an acoustic signal into the acoustic-signal conductor 3. In this case, the corresponding trigger pulse can be transmitted via a trailing cable of the lift cage 2. However, it can also be transmitted via an optical waveguide and optocoupler or by radio, and in the case of the latter, the acoustic-signal conductor 3 can be used as antenna for a receiving coil attached to the lift cage 2 and enclosing the acoustic-signal conductor 3. However, the signal transmitter 8 can also comprise a clock generator which is independent of the evaluating circuit 11.

The clock generator of the signal generator 8 generates at a predetermined clock rate, either due to triggering by the evaluating circuit 11 or independently of the latter, acoustic signals S which, after having been received by the signal output coupler 10, are evaluated by the evaluating circuit 11.

Figure 2:
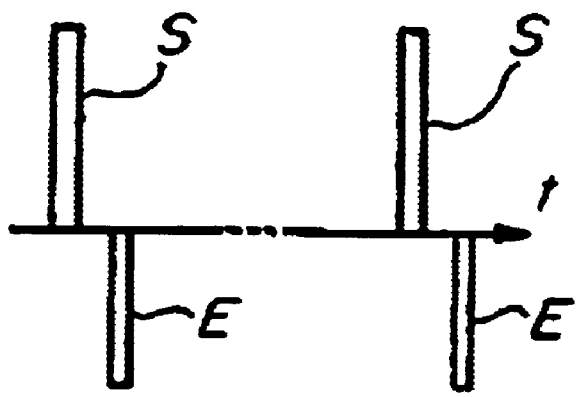
FIG. 2 shows an embodiment of a pulse sequence used by the device for position determination.

In addition, an acoustic compensation signal E following the acoustic signal S and having the opposite phase is in each case generated in accordance with FIG. 2. In particular, an acoustic compensation signal E having a shorter length and/or smaller amplitude than the previously incoupled acoustic signal S, corresponding to the hysteresis loop of the ferromagnetic material of the acoustic-signal conductor 3, is used in this arrangement. Between the incoupled acoustic signal S and the following acoustic compensation signal E, a time interval is suitably provided which is greater than the wavelength of the acoustic signal S but much shorter than the clock pulse spacing between the acoustic signals S, in order to prevent superpositions between the acoustic signals S and E. This effectively demagnetizes the acoustic-signal conductor 3 and, therefore, does not significantly attenuate subsequent acoustic signals S even with a great length of the acoustic-signal conductor.

Figure 3:
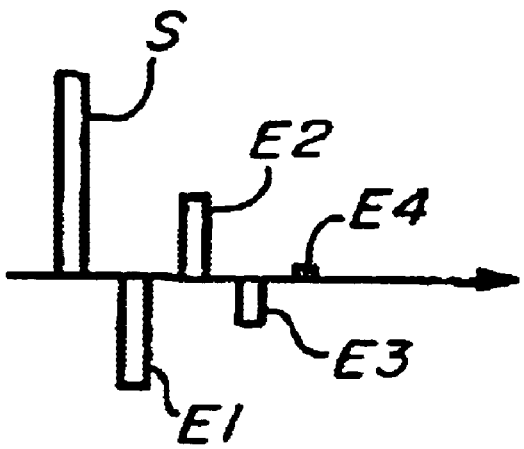
FIG. 3 shows a further embodiment of a pulse sequence used by the device for position determination.

A corresponding result is achieved if the respective acoustic signal S is followed by a sequence of acoustic compensation signals E1, E2, E3, E4 according to FIG. 3, the first acoustic compensation signal E1 having a phase which is opposite to the acoustic signal S and the subsequent acoustic compensation signals E2, E3, E4 again in each case having opposite phases to E1 and to one another. In this arrangement, a time interval which is greater than the wavelength of the acoustic signal S but much shorter than the clock pulse spacing between the acoustic signals S is also suitably provided between the acoustic signals S, E1, E2, E3, E4, in order to prevent superpositions between the acoustic signals S and E.

In this arrangement, the acoustic compensation signals E1, E2, E3, E4 decrease in amplitude uniformly, i.e. linearly, or, in particular, increasingly in accordance with a exponential curve, for instance a parabola, which includes the amplitude of the acoustic signal S.

It may also be suitable to provide a further signal output coupler 10' and a further evaluating unit 11' at the other end of the acoustic-signal conductor 3 in each case. This allows the position of the lift cage 2 to be determined in two channels, i.e. redundantly.

In the shaft 1, at least two switches 13, 14 can be provided which are operated by the lift cage 2 when it passes over them and then supply a signal to the evaluating unit 11. The latter stores, for example, a table with respect to the passing points of the switches 13, 14 at a certain temperature of, for example, 20° C. The position determination is then corrected in accordance with the deviations from this table, as a result of which the effects of changes in length of a building exhibiting the shaft 1 on the determination of the position of the lift cage 2 can be taken into consideration.

In the illustrative embodiment shown, the two switches 13, 14 are provided as series-connected normally-closed switches. However, a parallel connection is also possible, with the switches 13, 14 acting as normally-open switches. The switches 13, 14 can also be connected individually. If two evaluating units 11, 11' are provided, a part of the switches 13, 14 can also be coupled to one evaluating unit 11 and the other part can be coupled to the other evaluating unit 11'.

The object which can be moved along the acoustic-signal conductor 3 does not need to be a lift cage 2 but other objects can also be considered. Apart from this, the acoustic-signal conductor 3 does not need to be arranged vertically, either, but can exhibit any orientation corresponding to the direction of movement of the object, e.g. arranged horizontally.

While the invention has been shown and described with reference to preferred embodiments, it should be apparent to one of ordinary skill in the art that many changes and modifications may be made without departing from the spirit and scope of the invention as defined in the claims.

What is claimed is:

1. A method for detecting the position of an object moveable along an acoustic-signal conductor of ferromagnetic material, comprising the steps:
   incoupling an acoustic signal in a clocked manner into the acoustic-signal conductor by means of a signal input coupler connected to a signal transmitter;
   extracting the incoupled signal by means of a signal output coupler; and evaluating the extracted signal by an evaluating circuit for generating a signal representative of the instantaneous position of the object;
   wherein after the acoustic signal has been incoupled, an opposite magnetic field is applied for compensating for the residual magnetization originating from the incoupling of the acoustic signal.

2. The method according to claim 1, wherein the compensation energy is incoupled as acoustic compensation signal having the opposite phase to that of the acoustic signal.

3. The method according to claim 2, wherein an acoustic compensation signal having at least one of the features of the group consisting of a shorter length and a smaller amplitude than the previously incoupled acoustic signal, corresponding to the hysteresis loop of the ferromagnetic material of the acoustic-signal conductor, is used.

4. A method for detecting the position of an object moveable along an acoustic-signal conductor of ferromagnetic material, comprising the steps of;
   incoupling an acoustic signal in a clocked manner into the acoustic-signal conductor by means of a signal input coupler connected to a signal transmitter;
   extracting the incoupled signal by means of a signal output coupler; and evaluating the extracted signal by an evaluating circuit for generating a signal representative of the instantaneous position of the object;
   wherein in each case after the acoustic signal has been incoupled, a number of acoustic compensation signals having the opposite phase to the incoupled acoustic signal are incoupled at the beginning and subsequently in each case with changing phases and decreasing amplitude.

5. The method according to claim 4, wherein acoustic demagnetization signals having an amplitude decreasing in accordance with an exponential curve are used.

6. The method according to claim 1 or 4, wherein the signal input coupler, located at the moving object, is moved together with the latter, whereas the acoustic signal is extracted adjacent to at least one end of the acoustic-signal conductor by the signal output coupler.

7. The method according to claim 1 or 4, wherein the acoustic signal is incoupled adjacent to one end of the acoustic-signal conductor by the signal input coupler and is extracted by the signal output coupler located at the moving object.

8. The method according to claim 1 or 4, wherein a time interval which is greater than the wavelength of the acoustic signal is provided between the incoupled acoustic signal and the subsequent acoustic compensation signal(s).

9. The method according to claim 1 or 4, wherein the residual magnetization originating from the incouplion of the acoustic signal (S) is virtually compensated for.

10. The method according to claim 1 or 4, wherein the residual magnetization originating from the incouplion of the acoustic signal (S) is overcompensated for to form a corresponding magnetic field in the opposite direction.

11. The method according to claim 1 or 4, wherein the object is a lift cage moveable along a vertical shaft.

12. A device for detecting the position of an object moveable along an acoustic-signal conductor of ferromagnetic material, comprising a signal input coupler connected to a signal transmitter for the clocked incoupling of an acoustic signal into the acoustic-signal conductor and a signal output coupler which is connected to an evaluating circuit for generating a signal representative of the instantaneous position of the object, wherein in each case after the incoupling of the acoustic signal, an opposite magnetic field can be incoupled for compensating for the residual magnetization originating from the incoupling of the acoustic signal.

13. The device according to claim 12, wherein the compensation energy can be incoupled by the signal input coupler as at least one acoustic compensation signal.

14. The device according to claim 13, wherein the acoustic compensation signal have at least one of the features of the group consisting of a shorter length and a smaller amplitude than the previously incoupled acoustic signal, corresponding to the hysteresis loop of the ferromagnetic material of the acoustic-signal conductor.

15. A device for detecting the position of an object moveable along an acoustic-signal conductor of ferromagnetic material, comprising a signal input coupler connected to a signal transmitter for the clocked incoupling of an acoustic signal into the acoustic-signal conductor and a signal output coupler which is connected to an evaluating circuit for generating a signal representative of the instantaneous position of the object, wherein in each case after incoupling of the acoustic signal, a sequence of a number of acoustic compensation signals with opposite phase to the incoupled acoustic signal can be incoupled at the beginning and subsequently in each case with changing phases and decreasing amplitude.

16. The device according to claim 15, wherein the acoustic compensation signals exhibit an amplitude decreasing in accordance with an exponential curve.

17. The device according to claim 12 or 15, wherein a time interval which is greater than the wavelength of the acoustic signal is provided between the incoupled acoustic signal and the acoustic demagnetization signal(s).

18. The device according to claim 12 or 15, wherein the signal input coupler is arranged at the moving object and a signal output coupler is arranged adjacent to at least one end of the acoustic-signal conductor.

19. The device according to claim 12 or 15, wherein the signal input coupler is arranged adjacent to one end of the acoustic-signal conductor and the signal output coupler is arranged at the moving object.

20. The device according to claim 12 or 15, wherein the opposite magnetic field can be adjusted in such a manner that the acoustic-signal conductor is at least virtually demagnetized.

21. The device according to claim 12 or 15, wherein the opposite magnetic field can be adjusted in such a manner that overcompensation for the magnetic field generated by the acoustic signal is effected essentially with the same magnitude but in the opposite direction.

22. The decive according to claim 12 or 15, wherein the object is a lift cage moveable along a vertical shaft.

* * * * *

UNITED STATES PATENT AND TRADEMARK OFFICE
CERTIFICATE OF CORRECTION

PATENT NO.    : 6,659,232 B2
DATED         : December 9, 2003
INVENTOR(S)   : Christian Oelschlegel Page 1 of 1

It is certified that error appears in the above-identified patent and that said Letters Patent is hereby corrected as shown below:

Column 6,
Lines 32 and 35, delete "incouplion" and insert -- incoupling --
Line 56, delete "have" and insert -- has --

Signed and Sealed this

Twelfth Day of October, 2004

JON W. DUDAS
*Director of the United States Patent and Trademark Office*